(12) United States Patent
Kawata et al.

(10) Patent No.: US 6,666,808 B1
(45) Date of Patent: Dec. 23, 2003

(54) SHEET AND BLADE FOR SHAPING A SHEET BENT PORTION

(75) Inventors: Haruyoshi Kawata, Osaka (JP); Shoichi Omori, Osaka (JP)

(73) Assignee: Fuji Seal, Inc., Osaka (JP)

( * ) Notice: Subject to any disclaimer, the term of this patent is extended or adjusted under 35 U.S.C. 154(b) by 0 days.

(21) Appl. No.: 09/719,967

(22) PCT Filed: Jun. 17, 1998

(86) PCT No.: PCT/JP98/02712

§ 371 (c)(1),
(2), (4) Date: Dec. 18, 2000

(87) PCT Pub. No.: WO99/65786

PCT Pub. Date: Dec. 23, 1999

(51) Int. Cl.[7] .................................................. B31F 1/00
(52) U.S. Cl. ..................... 493/395; 493/397; 493/447
(58) Field of Search ................................ 493/395, 396, 493/397, 447, 61

(56) References Cited

U.S. PATENT DOCUMENTS

| | | | |
|---|---|---|---|
| 3,463,039 A | * | 8/1969 | Silver |
| 4,568,323 A | * | 2/1986 | Roeder |
| 4,642,086 A | | 2/1987 | Howarth, Jr. |
| 5,064,409 A | * | 11/1991 | Campbell et al. |
| 5,073,162 A | * | 12/1991 | Campbell et al. |
| 6,053,684 A | * | 4/2000 | Eckert et al. |

FOREIGN PATENT DOCUMENTS

| | | |
|---|---|---|
| JP | 56-5724 | 1/1981 |
| JP | 63-91455 | 6/1988 |
| JP | 64-40317 | 2/1989 |
| JP | 1-150520 | 6/1989 |
| JP | 8-39661 | 2/1996 |
| JP | 8-244146 | 9/1996 |

\* cited by examiner

*Primary Examiner*—Eugene Kim
(74) *Attorney, Agent, or Firm*—Jordan and Hamburg LLP

(57) ABSTRACT

The present invention provides a sheet with a folding portion that has a sheet body such as a plastic sheet, on which a folding portion (12) is formed perpendicular with respect to the folding direction (X). The folding portion (12) of the sheet includes a large number of recesses (14) and remnants (16) defined between the recesses (14) formed on the sheet body (10). Boundary lines (18) between the recesses (14) and the remnants (16) each are tilted at acute angle with respect to the folding portion-forming direction (Y) and towards the same side as that of an opposite one of the boundary lines (18) with a corresponding remnant (16) therebetween. The present invention also provides a shaping blade for shaping the folding portion on the sheet.

17 Claims, 10 Drawing Sheets

SHEET AND BLADE FOR SHAPING A SHEET BENT PORTION

FIELD OF THE INVENTION

This invention relates to a sheet and a blade for shaping a sheet folding portion, and more particularly a sheet foldable along a folding portion, and a blade for shaping the folding portion on the sheet, which are applicable, for example to manufacturing of a clear case ( a box formed by folding a plastic sheet).

BACKGROUND OF THE INVENTION

There have been known sheets adapted to be folded, such as one described in the Japanese Unexamined Utility Model Application Publication No. Sho-63-91455. The sheet described in the cited publication includes a recessed groove disposed orthogonal to a sheet folding direction, and a folding portion including recesses and protrusions formed on the bottom portion of the recessed groove in the lengthwise direction (Prior Art 1).

Unlike the recesses and protrusions, it is also known the sheet with holes intermittently formed on the bottom portion of the recessed groove in the lengthwise direction thereof (Japanese Unexamined Patent Application Publication No. Sho-64-40317, Prior Art 2).

The sheets of the Prior Arts 1 and 2 each are foldable precisely along the recessed groove, and possess capabilities of maintaining the strength and preventing the breakage of the sheet through shallow portions of the recessed groove, while exhibiting foldability through deep portions or intermittently formed holes of the recessed groove, thereby rendering the sheet foldable.

As a sheet described in the Unexamined Japanese Patent Application Publication No. Hei-1-150520, it is also know a sheet with reinforcing ribs shaped between the recesses and protrusions on the bottom portion of the recessed-groove in the lengthwise direction (Prior Art 3).

However, any conventional sheets as described above pose problems that they have the folding portion of less strength when a deeply recessed groove is provided or the protrusions in the recessed groove are shaped with smaller dimension, and on the contrary, they have less foldability when the protrusions are shaped with larger dimension in order to maintain the strength of the sheet.

That is, taking the Prior Art 3 for example, the reinforcing ribs are shaped perpendicular to the recessed groove (in the folding direction), so that the reinforcing ribs abut against each other when the sheet is folded towards the side thereof with the recessed groove, thereby preventing the sheet from folding. This poses a problem of deteriorating the foldability of the sheet. In addition, the sheet with the smaller reinforcing ribs shaped for assuring the foldability also poses a problem of lacking the sheet strength.

On the other hand, when the sheet is folded towards the side thereof without the recessed groove, the reinforcing ribs are subjected to the force applied in the sheet tearing direction, so that the reinforcing ribs may be broken or similar events may occur. When the larger reinforcing ribs are shaped to prevent such a breakage, it also poses a problem of deteriorating the foldability of the sheet.

SUMMARY OF THE INVENTION

The present invention has been conceived to solve the above problems. It is an object of the present invention to provide a sheet that is capable of simultaneously satisfying the demands on the foldability and the strength of the sheet.

The present invention has been conceived to solve the above problems by providing a sheet, which includes a sheet body 10 such as a plastic sheet with a folding portion 12 provided perpendicular to the folding direction X, which is characterized by that the folding portion 12 includes a large number of recesses 14 and remnants 16 between the recesses 14 shaped on the sheet body 10, boundary lines 18 defined between the recesses 14 and the remnants 16 each are tilted at acute angle with respect to the folding portion-forming direction Y and towards the same side as that of an opposing one of the boundary lines 18 with a corresponding remnant 16 therebetween.

According to the sheet of the present invention having the above arrangement, when the sheet body 10 is folded along the folding portion 12 in the folding direction X, the remnants 16 each having the corresponding opposite boundary lines 18 tilted towards the same side are brought into a twisted state, so that the remnants 16 are unlikely to abut each other. In addition, even if the force is effected on the remnants 16 in the sheet tearing direction, the tilted boundary lines 18 of the remnants 16 can disperse the tearing direction oriented force, thereby preventing the breakage of the remnants 16.

Thus, the sheet of the above arrangement is advantageous in the fact that it can simultaneously satisfy the demands on the foldability and the sheet strength.

According to the sheet of the present invention, all the boundary lines 18 between the recesses 14 and the remnants 16 are preferably tilted in such a manner as to be aligned parallel to each other. This advantageously enables the folding portion 12 to be easily shaped.

The boundary lines 18 between the recesses 14 and the remnants 16 each are preferably tilted at an angle of 5 degrees or more with respect to the folding portion-forming direction Y, which advantageously enables the folding portion 12 to be easily shaped. That is, if the tilting angle is less than 5 degrees, the shaping of the folding portion 12 of the sheet body 10 involves a troublesome work. In addition, when the folding portion 12 is shaped such as by the pressure effected by a blade for shaping the sheet folding portion, the blade may decrease the strength of its own. To solve these problems, the tilting angle is more preferably set to 10 degrees or more.

On the other hand, the tilting angle is preferably set to 60 degrees or less, thereby enabling the sheet to sufficiently exhibit its strength. That is, when the tilting angle is set to more than 60 degrees, it is unlikely to smoothly disperse the tearing direction oriented force caused on the remnants 16, with the result that the breakage of the remnants 16 cannot reliably be prevented. To reliably prevent such a breakage, the tilting angle is more preferably set to 30 degrees or less.

Each recess 14 has the length L1 in the folding portion-forming direction Y, which is preferably set to 0.5 times or more the sheet thickness H. When the folding portion 12 with the tilting angle of less than 0.5 times is shaped by the blade, the blade is unlikely to assure a sufficient strength. As a result, the blade may have a nicked edge during the mass production of the sheet. On the contrary, the tilting angle of 0.5 times or more renders the sheet suitable for the mass production.

The length L1 of each recess 14 in the folding portion-forming direction Y is preferably set to 100 times or less the sheet thickness H. When the folding portion with the recesses 14 each having the length L1 of 100 times or more is applied to an assembly case or the like, corner portions thereof are largely deformed, posing problems that the assembly case cannot be firmly assembled, and hence the folding portion may be broken. On the contrary, the length L1 of 100 times or less is advantageous that the folding portion 12 is prevented from being broken.

Further, each remnant 16 has the length L2 in the folding portion-forming direction Y, which is preferably set to 0.3 times or more the sheet thickness H. When the length L2 of the remnant 16 is set to less than 0.3 times, the strength is extremely reduced, with the result that the sheet may be torn apart at the folding portion 12. On the contrary, the length L2 of 0.3 times or more is advantageous that the sheet is prevented from being torn apart at the folding portion 12.

Still further, the length L2 of each remnant 16 in the folding portion-forming direction Y is preferably set to three times or less the sheet thickness H. The remnants 16 each having the length L2 set to more than three times tend to harden, allowing the folding portion 12 to be easily broken. On the contrary, the length L2 of 3 times or less is advantageous that the sheet is prevented from being broken at the folding portion 12.

It is possible to adjust the magnitudes of the foldability and the strength of the sheet by varying the tilting angle of the boundary lines 18 with respect to the folding portion-forming direction Y, the length L1 of the recesses 14 in the folding portion-forming direction Y, the length L2 of the remnants 16 in the folding portion-forming direction Y, the depth of the recesses 14, the thickness of the remnants 16, or the like. The numerical values as mentioned above are thus determined according to the thickness and material of the sheet, as well as the intended use of the sheet.

According to the present invention, there is also provided a blade for shaping the sheet folding portion 12 including the recesses 14 and the remnants 16 shaped on the sheet body 10 such as a plastic sheet, which is characterized by that a blade body 20 includes a plurality of protrusions 24 for shaping the recesses 14 and cut-outs 26 each shaped between the protrusions 24, and the cut-outs 26 each have opposite side walls 28 which are tilted towards the same side and at acute angle with respect to the folding portion-forming direction Y.

When the blade of the present invention having the above arrangement is applied to the shaping of the folding portion 12 on the sheet body 10 such as a plastic sheet, it is possible to shape the recesses 14 between the remnants 16 by means of the protrusions 24, while leaving the portions corresponding to the cut-outs 26 intact. In this regard, the cut-outs 26 each have the opposite side walls 28 tilted towards the same side and at acute angle with respect to the folding portion-forming direction Y, so that the folding portion 12 can be shaped on the sheet body 10 with the recesses 14 and the remnants 16 defining the boundary lines 18 each tilted at acute angle with respect to the folding portion-forming direction Y and towards the same side as that of an opposite one of the boundary lines 18 with a corresponding remnant 16 therebetween.

BRIEF DESCRIPTION OF THE DRAWINGS

FIGS. 2 are reference views of a blade for shaping a sheet folding portion, in which

FIGS. 3 are reference views of the sheet according to the same embodiment, in which

FIGS. 4 are reference views of the sheet according to another embodiment, in which

FIGS. 5 are reference views of the sheet according to still another embodiment, in which

FIGS. 6 are reference views of the sheet according to yet another embodiment, in which

FIGS. 7 are reference views of the blade for shaping the sheet according to another embodiment, in which

DETAILED DESCRIPTION OF THE PREFERRED EMBODIMENTS

Figure 1:
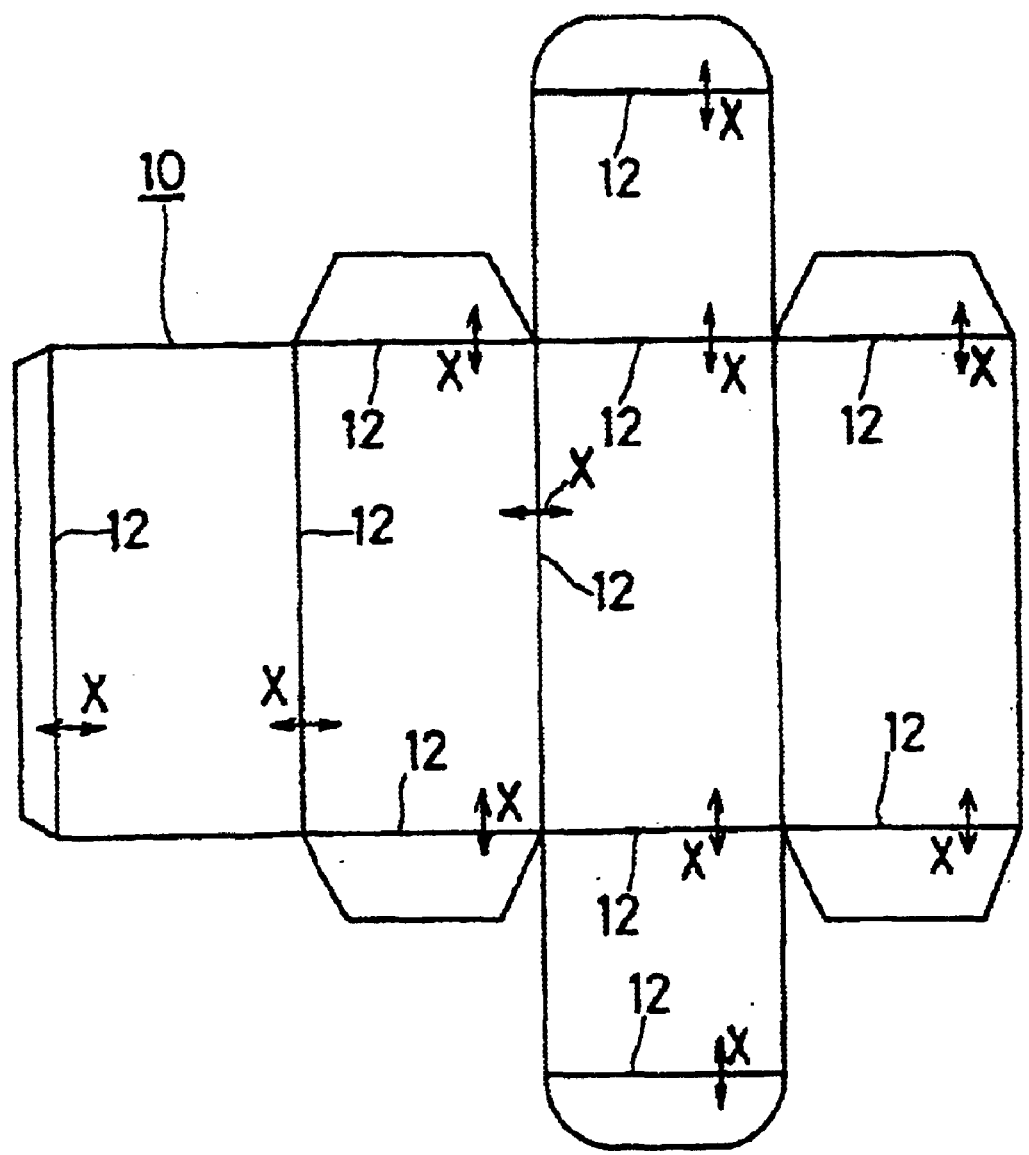
FIG. 1 is a front view of a sheet according to a first embodiment of the present invention.

As an embodiment of the present invention, the description will be hereinafter made for a sheet with a sheet body 10 on which folding portions 12 are respectively shaped perpendicular to the folding direction X for assembling of the sheet as a packaging container for products or the like, as illustrated in FIG. 1, as well as a shaping blade for shaping the folding portions 12 on the sheet. First, the shaping blade according to one embodiment of the present invention will be described with reference to FIGS. 2.

Figure 2A:
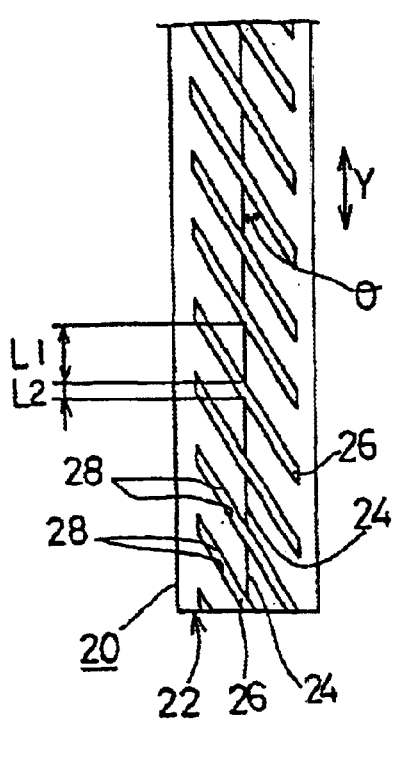
FIG. 2A is a bottom view of an essential part.
Figure 2B:
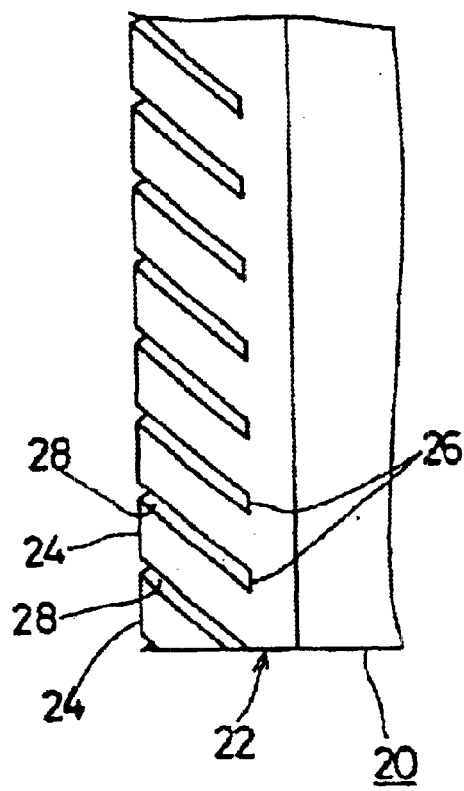
FIG. 2B is a side view of the essential part.
Figure 2C:
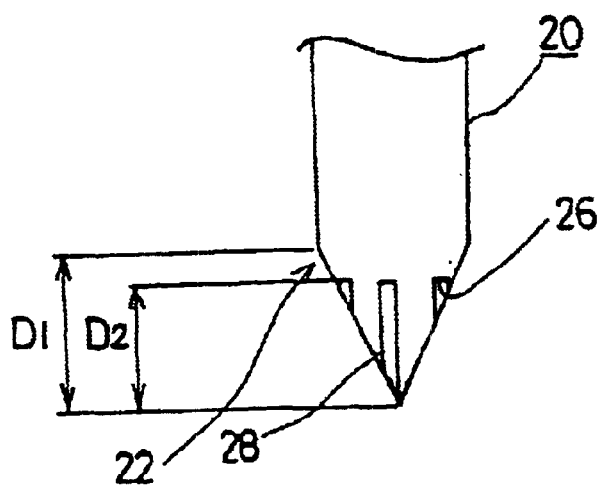
FIG. 2C is a front view of the essential part.

In FIGS. 2, a reference numeral 20 represents a blade body having a rectangular shape as viewed from the lateral side. The blade body 20 is shaped so as to have a tip end portion 22 having a V-like shape as viewed in the folding portion-forming direction Y as illustrated in FIG. 2C with a protruding length of 0.3 mm (the length D1 indicated in FIG. 2C). A plurality of cut-outs 26 are shaped on the tip end portion 22 with spacing from each other, each having a parallelogram shape in plan and a depth of 0.2 mm (the length D2 indicated in FIG. 2C).

As illustrated in FIG. 2A, the cut-outs 26 each have opposite side walls 28, which are tilted at an angle of 30 degrees (θ indicated in FIG. 2A) with respect to the folding portion-forming direction Y.

The length L2 of each cut-out 26 in the folding portion-forming direction Y is set to 0.09 mm, while the length L1 of each protrusion 24 in the folding portion-forming direction Y is set to 0.21 mm.

In order to shape the folding portion 12 on the sheet body 10 by means of the shaping blade having the above arrangement, the sheet body 10 is first placed on a flat table, and the shaping blade is pressed from above onto the sheet body 10 on the table. In this regard, it is possible to facilitate the shaping of the folding portion 12 by heating the blade body 20 prior to the pressing.

Now, the description will be made with reference to FIG. 3 for the sheet according to one embodiment of the present invention, which is obtainable in the manner as described above. The sheet body 10 is made of hard or semi-hard plastic material such as poly vinyl chloride, polypropylene, polyester or polystyrene, and has a thickness H of 0.3 mm. The pressing operation will be described by taking for example the case that the shaping blade is pressed onto the sheet body 10 so that the tip portion of each protrusion 24 of the blade body 20 is pressed into the sheet body 10 by 0.15 mm.

With the shaping blade, a plurality of the recesses 14 are shaped with a predetermined space from each other by the protrusions 24 of the blade body 20, while the remnants 16 each having a parallelogram shape are left intact between the recesses 14 (portions corresponding to the cut-outs 26 of the blade body 20). The recesses 14 and the remnants 16 together form the folding portion 12.

Figure 3A:
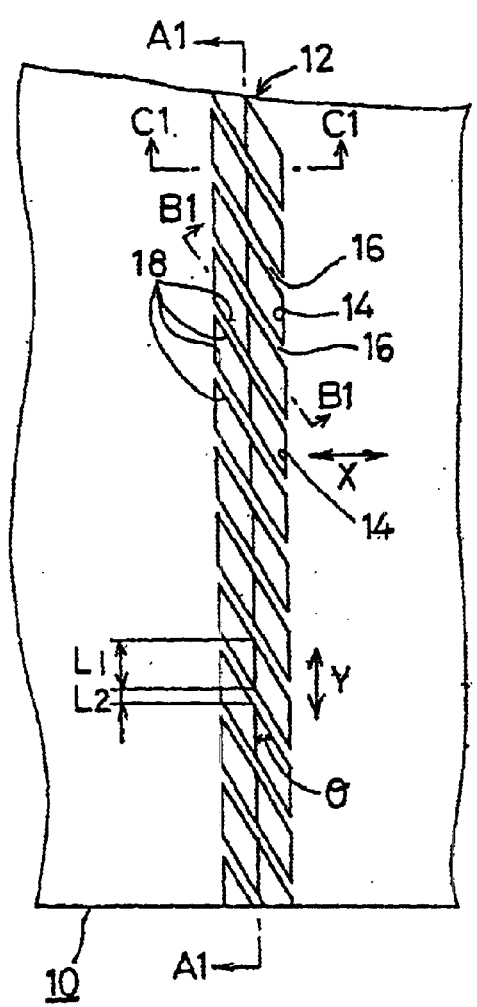
FIG. 3A is a plan view of an essential part.
Figure 3B:
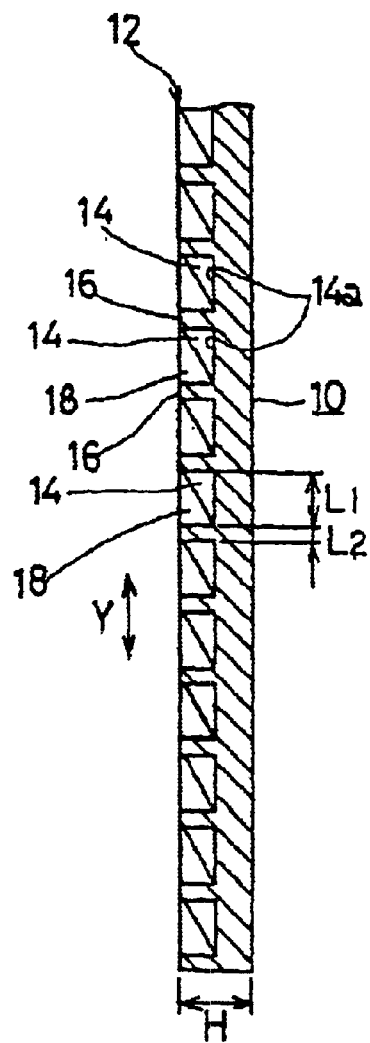
FIG. 3B is a cross section taken along lines A1—A1 in FIG. 3A.
Figure 3C:
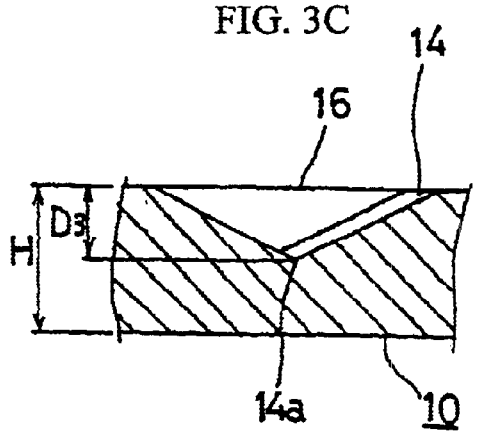
FIG. 3C is an enlarged cross section taken along lines B1—B1 in FIG. 3B.
Figure 3D:
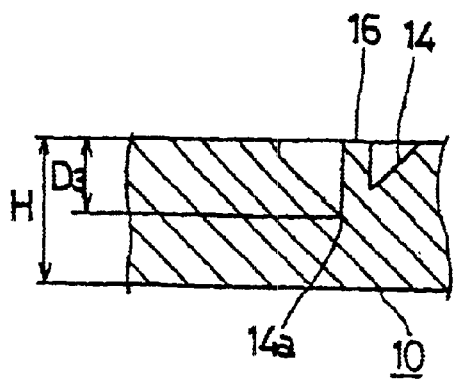
FIG. 3D is an enlarged cross section taken along lines C1—C1 in FIG. 3A.
Figure 4A:
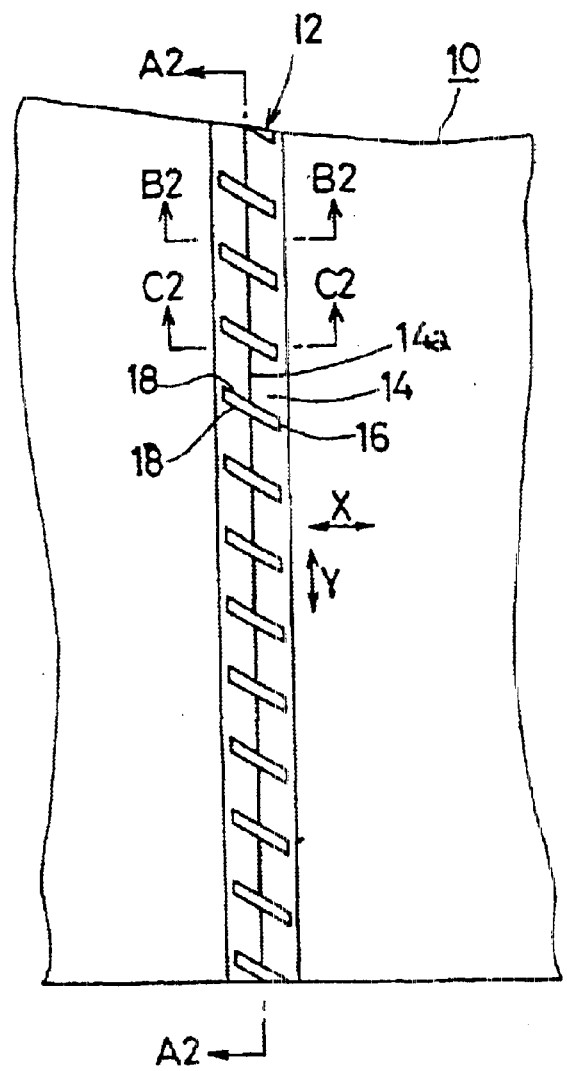
FIG. 4A is a plan view of an essential part.
Figure 4B:
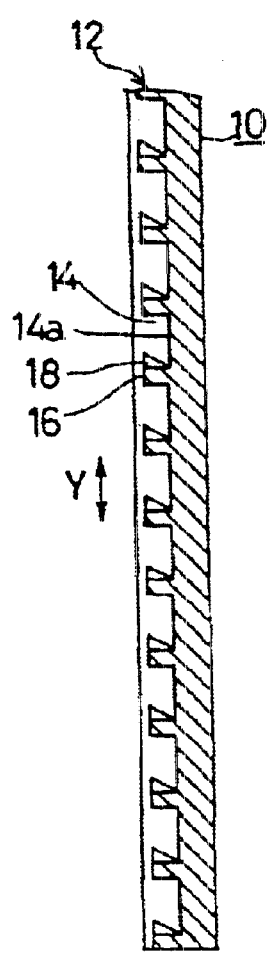
FIG. 4B is a cross section taken along lines A2—A2 in FIG. 4A.
Figure 4C:
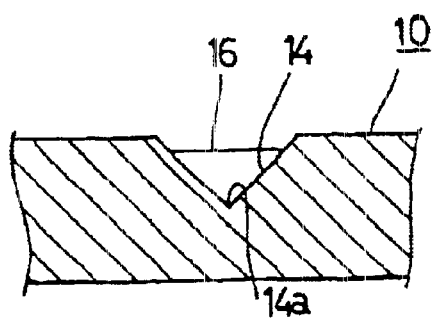
FIG. 4C is an enlarged cross section taken along lines B2—B2 in FIG. 4A.
Figure 4D:
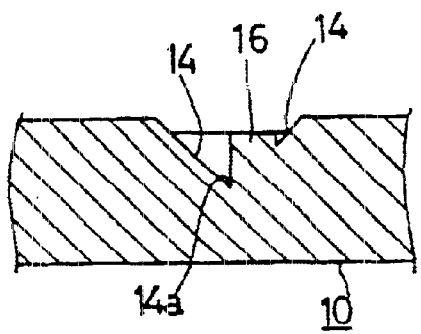
FIG. 4D is an enlarged cross section taken along lines C2—C2 in FIG. 4A.
Figure 5A:
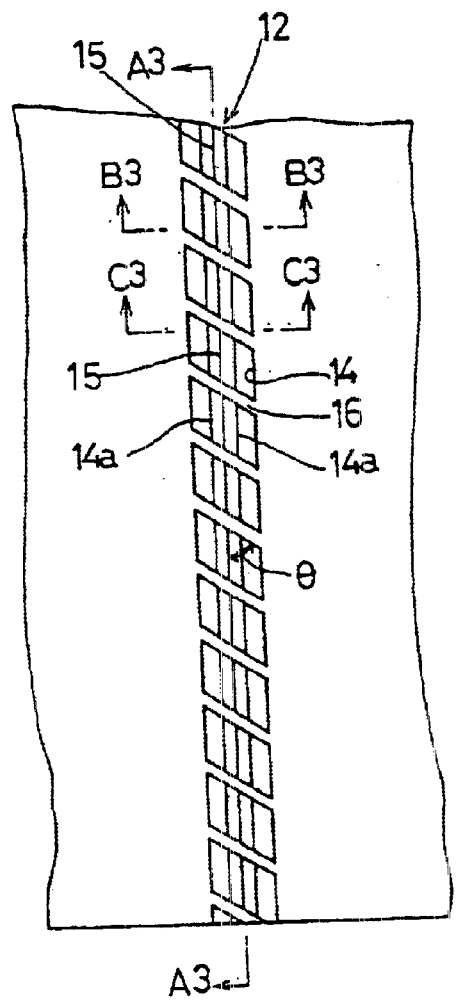
FIG. 5A is a plan view of an essential part.
Figure 5B:
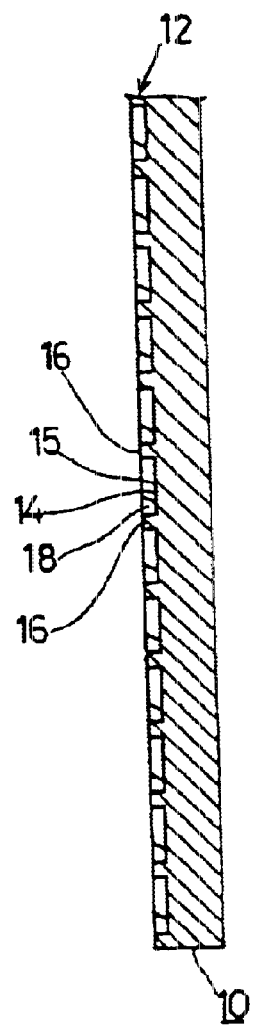
FIG. 5B is a cross section taken along lines A3—A3 in FIG. 5A.
Figure 5C:
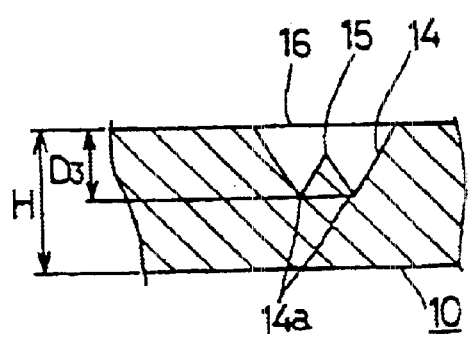
FIG. 5C is an enlarged cross section taken along lines B3—B3 in FIG. 5A.
Figure 5D:
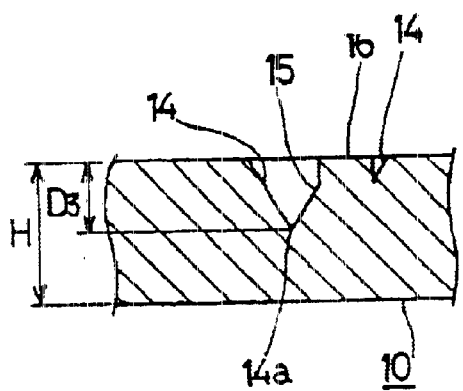
FIG. 5D is an enlarged cross section taken along lines C3—C3 in FIG. 5A.

In the above arrangement, the recesses 14 each are formed into a V-like shape as viewed in the folding portion-forming direction Y, as illustrated in FIG. 3C, in which the depth D3 from the surface of the sheet body 10 to the bottom portion 14a of the recess 14 is set to 0.15 mm, which is equivalent to 0.5 times the thickness H of the sheet body 10.

The recesses 14 each are formed into a parallelogram shape in plan, as illustrated in FIG. 3A, so that all the boundary lines 18 between the recesses 14 and the remnants 16 are formed with straight lines parallel to each other.

In this arrangement, the boundary lines 18 are tilted at an angle of 30 degrees with respect to the folding portion-forming direction Y (θ indicated in FIG. 3A).

The length L1 of each recess 14 in the folding portion-forming direction Y is set to 0.21 mm, which is equivalent to 0.7 times the thickness H of the sheet body 10, while the length L2 of each remnant 16 in the folding portion-forming direction Y is set to 0.09 mm, which is equivalent to 0.3 times the thickness H of the sheet.

According to the sheet having the above arrangement, when the sheet body 10 is folded towards the front side forming thereon the folding portions 12 along the folding portions 12 in the folding direction X, the remnants 16 with the boundary lines 18 tilted towards the same side and parallel to each other are brought into a twisted state, so that the folded portions do not abut each other. Thus, the sheet can easily be folded and maintain its strength.

When the sheet body 10 is folded towards the rear side forming thereon no folding portions 12, the force is applied on the remnants 16 in the tearing direction. However, the tilted boundary lines 18 of the remnants 16 disperse the tearing direction oriented force, so that the breakage of the remnants 16 can be prevented.

As a further advantage, the boundary lines 18 tilted to the same side and parallel to each other are brought into a twisted state such as they fall sideways, so that the sheet can easily be folded.

The shaping blade and the sheet according to the above embodiments respectively having the above arrangements are advantageous as described above. However, the present invention is not necessarily limited to the above arrangements. Rather, they can suitably be modified within the intended scope of the present invention.

Specifically, the remnants 16 are not limited to those with the sheet thickness kept intact. For example, it falls within the intended scope of the present invention that recesses shallower than the recesses 14 are respectively formed on the remnants 16, enabling the remnants 16 to have a larger sheet thickness as compared with the recesses 14, as illustrated in FIGS. 4.

The sheet body with the thus shaped folding portions 12 is unlikely to have the remnants 16 protruding through angularly folded portion of the folded sheet, when the sheet body is folded towards the side with no recessed groove thereon.

However, the remnants 16 with the sheet thickness kept intact can produce desirable effects that the sheet strength can be maintained, and the folding portions 12 can easily be shaped. Specifically, the remnants 16 with the recesses as illustrated in FIGS. 4 involve the necessity to shape the recesses 14 and the remnants 16 with the exact depth, which may lower the strength of the sheet itself or deteriorate the foldability. On the contrary, the remnants 16 with the sheet thickness kept intact are unlikely to cause undesirable effects on the strength and foldability of the sheet itself, even if the recesses 14 have different thicknesses, so that the folding portions 12 can easily be shaped, thereby rendering the thus arranged remnants advantageous.

In the embodiment as illustrated in FIGS. 4, the boundary lines 18 are tilted at an angle of 60 degrees with respect to the folding portion-forming direction Y.

In the present invention, the recess 14 are also not necessarily limited to those with the same depth. Rather, it is possible to shape the recesses 14 with different depths from each other, such as alternately arrange the recesses 14 with a larger depth and those with a smaller depth.

The depth D3 from the surface of the sheet body 10 to the bottom portion 14a of the recesses 14 is not necessarily limited to that equivalent to 0.5 times the thickness H. Rather, it falls within the intended scope of the present invention that the recesses 14 are formed by perforating the sheet body 10. It is preferable to shape the recesses 14 with the depth ranging from 0.5 to 1 time the thickness H of the sheet body 10, when considering the foldability or the like.

Moreover, the recesses 14 each are not necessarily formed into a V-like shape as viewed in the folding portion-forming direction Y. It also falls within the intended scope of the present invention that the recesses 14 each are formed into a W-like shape with a protrusion 15 at the center, as viewed in the folding portion-forming direction Y, as illustrated in FIGS. 5, and into a V-like shape as viewed in the tilting direction of one recess 14, as illustrated in FIGS. 6.

Figure 6A:
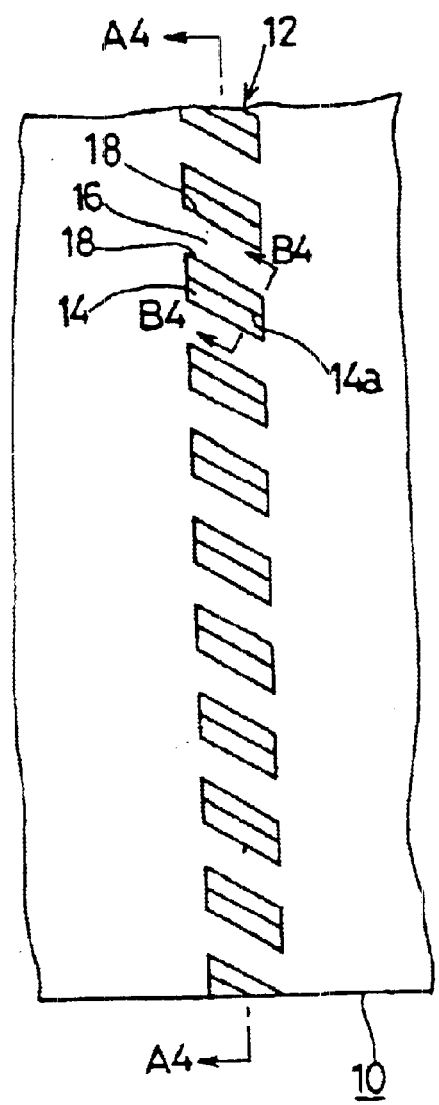
FIG. 6A is a plan view of an essential part.
Figure 6B:
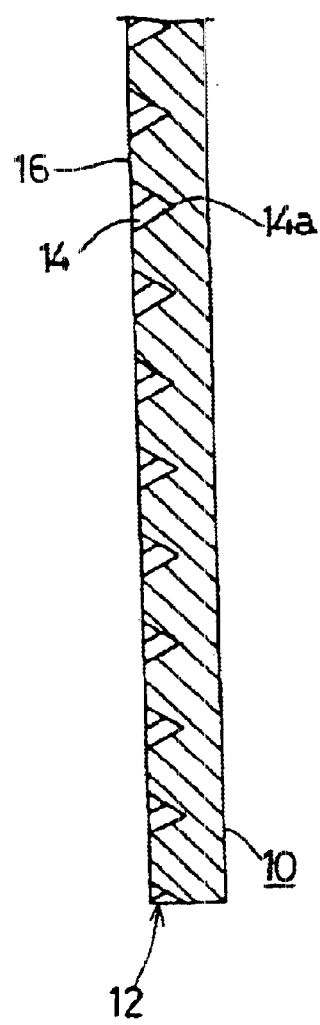
FIG. 6B is a cross section taken along lines A4—A4 in FIG. 6A.
Figure 6C:
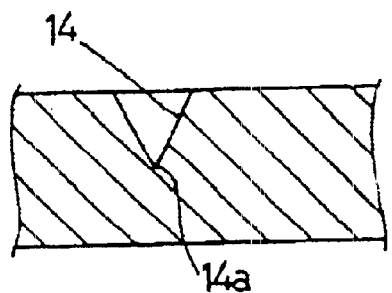
FIG. 6C is an enlarged cross section taken along lines B4—B4 in FIG. 6A.
Figure 7A:
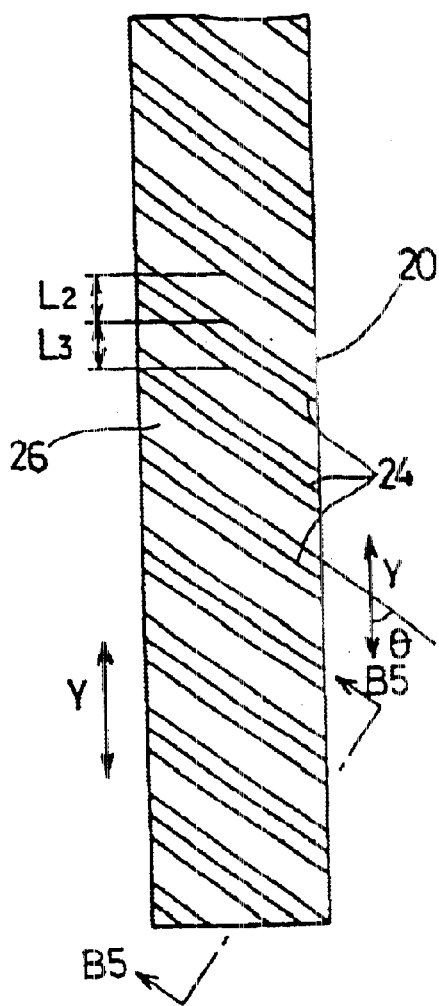
FIG. 7A is a plan view.
Figure 7B:
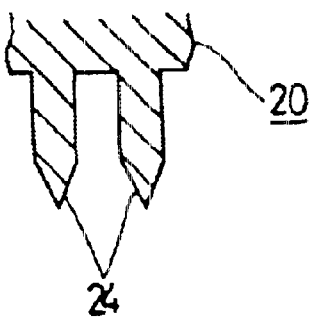
FIG. 7B is a cross section taken along lines B5—B5 in FIG. 7A.

However, it is troublesome to shape the folding portions 12 in the sheet with the recesses 14 having a V-like shape as viewed in the tilting direction of one recess 14, as illustrated in FIGS. 6. Therefore, the recesses 14 preferably have the bottom portions 14a aligned in the folding portion-forming direction Y, as illustrated in FIGS. 3 to 5. Specifically, when the sheet as illustrated in FIGS. 6 is to be shaped by means of the shaping blade, it is necessary to provide the blade body 20 with a plurality of protrusions 24, as illustrated in FIGS. 7. Such a blade poses problems that it is difficult to be manufactured and also lacks the strength at the protrusions 24. On the contrary, the recesses 14 with the bottom portions 14 extending in the folding portion-forming direction Y can be manufactured by means of the blade body 20 with the cut-outs 26 only provided on predetermined portions of the tip end portion 22 of the blade body disposed in the folding portion-forming direction Y. The thus arranged shaping blade can advantageously shape the folding portions 12 in easy manner.

Figure 8A:
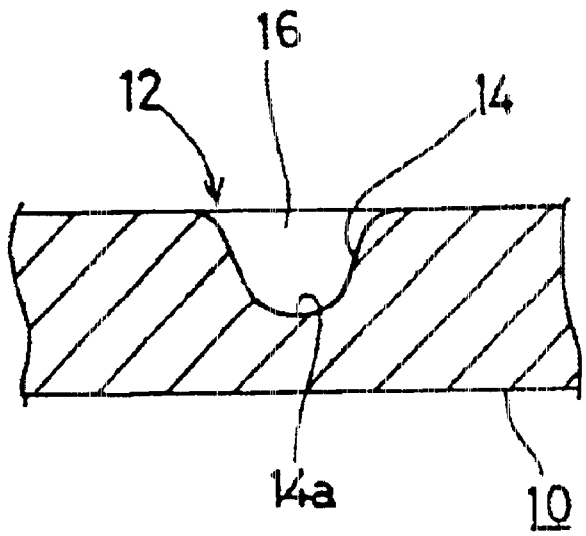
FIG. 8A is a reference view of the sheet according to another embodiment, and an enlarged cross section of an essential part as viewed from the folding portion-forming direction.
Figure 8B:
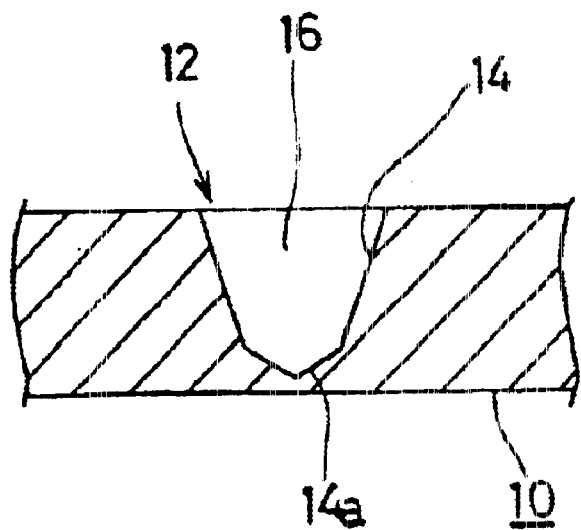
FIG. 8B is also a reference view of the sheet according to still another embodiment and an enlarged cross section of an essential part as viewed from the folding portion-forming direction.

For providing the recesses with the bottom portions 14a extending in the folding portion-forming direction Y, it is possible to match the bottom portions 14a of the recesses 14 with the rear surface of the sheet body 10, or form the recesses 14 by perforating the sheet body 10. It is also possible to employ the recesses 14 having a bottomed V-like shape, W-like shape, or U-like shape as viewed in the folding portion-forming direction Y (see FIGS. 8).

Figure 9:
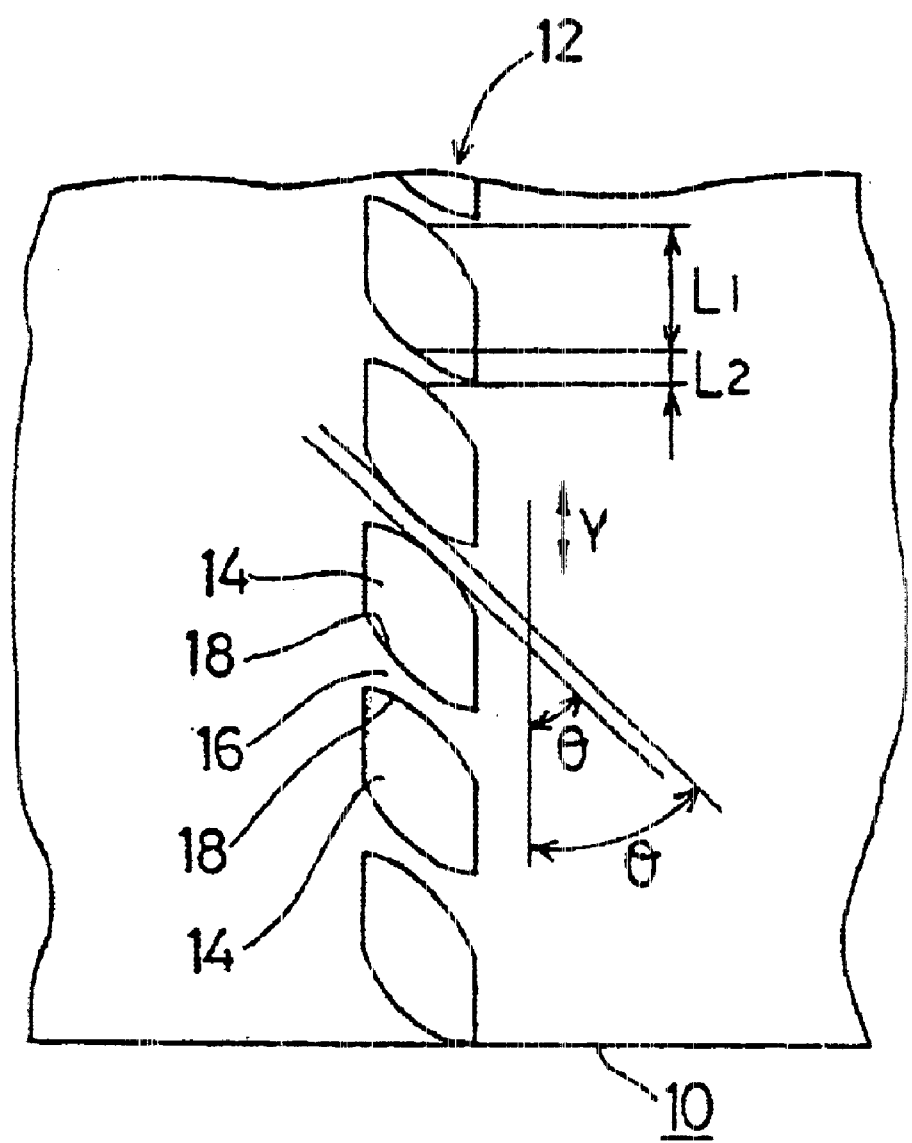
FIG. 9 is a plan view of an essential part of the sheet according to yet another embodiment.

Moreover, it is not necessary to form the boundary lines 18 with straight lines. It also falls within the intended scope of the present invention to form the boundary lines 18 with curved lines or the like as illustrated in FIG. 9, as long as they have opposite boundary lines 18 with a corresponding remnant 16 therebetween which are respectively inclined at least towards the same side.

Figure 10:
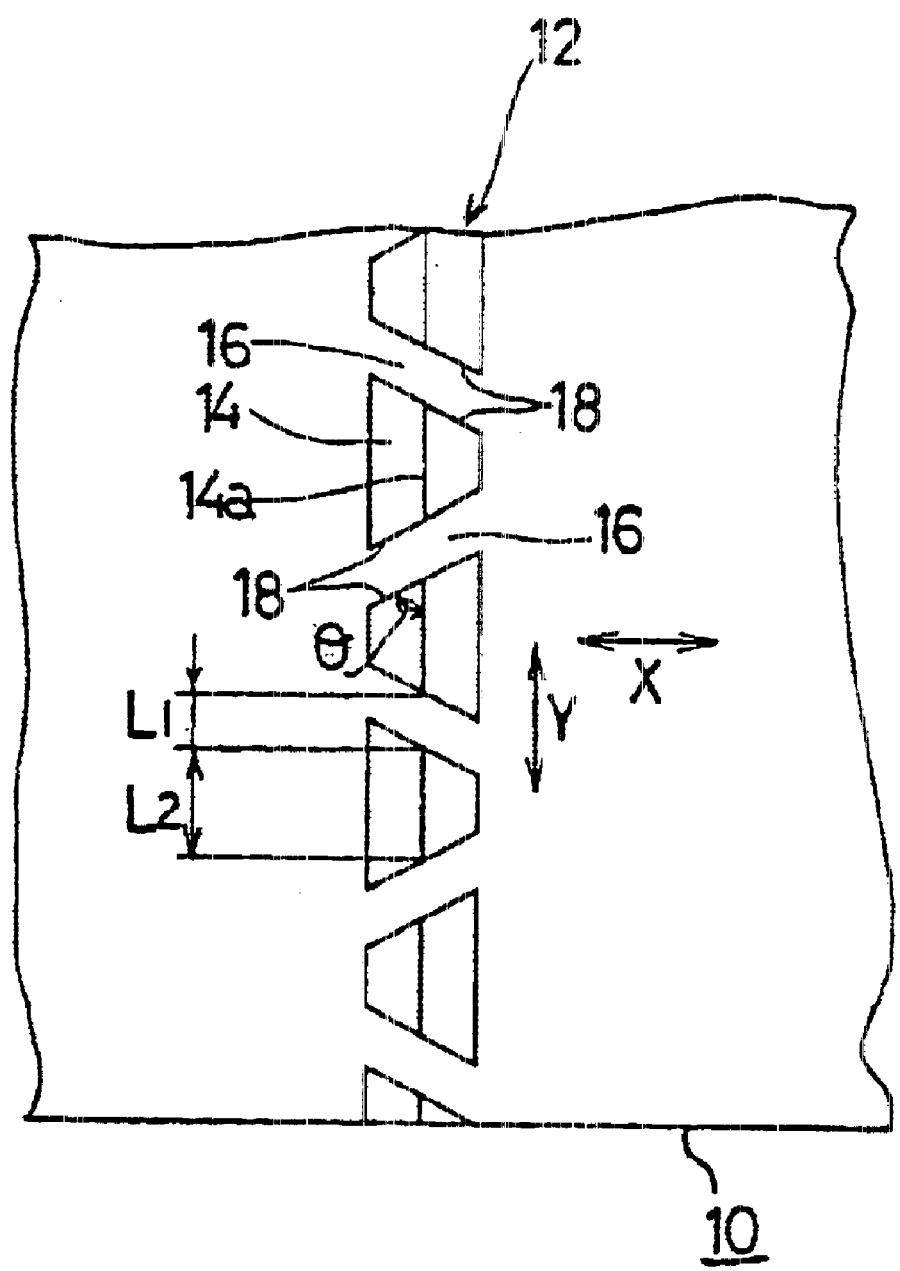
FIG. 10 is a plan view of an essential part of the sheet according to still another embodiment.

It is not necessary to form the boundary lines 18 parallel to each other. As illustrated in FIG. 10, it falls within the intended scope of the present invention that the opposite boundary lines 18 with a corresponding recess 14 therebetween are tilted towards the opposite sides.

In all the above embodiments, the descriptions were made for the arrangement where the recesses 14 and the remnants 16 are sharply defined by the boundary lines 18, and hence the boundary lines 18 sharply appear as lines. In the present invention, the boundary lines 18 represent the lines which are expected to be formed between the recesses 14 and the remnants 16 when shaping the recesses 14 while leaving the remnants 16 intact, and therefore those which will not be sharply seen as lines when shaping each folding line 12 also falls within the intended scope of the present invention.

In the above embodiments, the descriptions were made for the recesses 14 which are disposed at even intervals. However, the present invention is not limited to this arrangement. Rather, the recesses 14 can be disposed at irregular intervals.

However, it is preferable to equally dispose the recesses 14 such as by providing the recesses 14 at substantially even intervals. This enables the uniform foldability and strength throughout each folding portion 12.

The cutting blades in the above embodiments were described as having the blade body 20 of the rectangular shape as viewed from the lateral side. However, the present invention is not limited to this shape. Rather, it falls within the intended scope of the present invention that the blade includes the blade body 20 of a rounded shape as viewed from the lateral side and is adapted to shape the folding portions 12 through the rotation on the sheet.

What is claimed is:

1. A sheet with a folding portion, the sheet comprising:
a sheet body on which the folding portion is oriented along a folding portion-forming direction which is perpendicular to a folding direction, said folding portion including a series of recesses and remnants between said recesses, boundary lines being defined between the recesses and the remnants, said boundary lines each being tilted at an acute angle with respect to the folding portion-forming direction and towards a same side as that of an opposite one of the boundary lines having a corresponding remnant therebetween, area portions of said sheet body corresponding positionally to said remnants each having a generally flat surface on at least one side of said sheet body.

2. A sheet according to claim 1, wherein all of the boundary lines between said recesses and the remnants are tilted in such a manner as to be aligned parallel to each other.

3. A sheet according to any one of claims 1 and 2, wherein said boundary lines between said recesses and said remnants are tilted at an angle of 5 to 60 degrees with respect to the folding portion-forming direction.

4. A sheet according to any one of claims 1 and 2, wherein:
said recesses each have a length in the folding portion-forming direction which is in a range of about 0.5 to about 100 times a thickness of the sheet; and
said remnants each have a length in the folding portion-forming direction which is in a range of about 0.3 to about 3 times the thickness of the sheet.

5. A foldable sheet according to claim 1, wherein:
said sheet body includes a first side and second side facing in a direction opposite to said first side, said first and second sides being spaced apart by a thickness of said sheet body;
said recesses comprise indentations formed in said first side and extending towards said second side of said sheet body a distance less than said thickness; and
said at least one side of said sheet body on which said area portions of said sheet body corresponding positionally to said remnants have a generally flat surface includes said second side of said sheet body.

6. A foldable sheet according to claim 5, wherein the remnants have a same thickness as said thickness of said sheet body.

7. A foldable sheet according to claim 5, wherein at least a portion of the remnants have a reduced thickness relative to said thickness of said sheet body, said remnants being recessed from said first side.

8. A foldable sheet according to claim 5, wherein said indentations have a generally V-shaped contour in cross section.

9. A foldable sheet according to claim 5, wherein said indentation have a generally W-shaped contour in cross section.

10. A foldable sheet according to claim 1, wherein:
said sheet body includes a first side and second side facing in a direction opposite to said first side, said first and second sides being spaced apart by a thickness of said sheet body; and
said recesses comprise perforations extending across said thickness, said perforations being open to said first and second sides.

11. A foldable sheet according to claim 10, wherein the remnants have a same thickness as said thickness of said sheet body.

12. A foldable sheet according to claim 10, wherein at least a portion of the remnants have a reduced thickness relative to said thickness of said sheet body, said remnants being recessed from said first side.

13. A foldable sheet according to claim 1, wherein opposite ones of said boundary lines each having a corresponding recess therebetween are tilted towards opposite sides with respect to the folding portion-forming direction.

14. A blade for shaping a folding portion including recesses and remnants on a sheet body, the blade comprising:
a blade body having a forming edge for pressably contacting the sheet body when urged towards the sheet body in a direction generally perpendicular to a plane of the sheet body, said forming edge being arranged along a extended direction corresponding to a folding portion-forming direction which is perpendicular to a folding direction of the sheet body, said forming edge including protrusions for shaping said recesses and cut-outs formed between said protrusions, said cut-outs each having opposite side walls which are laterally tilted towards a same side and at acute angle with respect to the extended direction.

15. A blade according to claim 14, wherein said side walls are tilted towards a common side relative to the extended direction.

16. A sheet with a folding portion, the sheet comprising:

a sheet body on which the folding portion is oriented along a folding portion-forming direction which is perpendicular to a folding direction, said folding portion including a series of recesses and remnants between said recesses, boundary lines being defined between the recesses and the remnants, said boundary lines each being tilted at an acute angle with respect to the folding portion-forming direction and towards the same side as that of an opposite one of the boundary lines having a corresponding remnant therebetween, said sheet body including a first side and second side facing in a direction opposite to said first side, said first and second sides being spaced apart by a thickness of said sheet body, said recesses partially extending through said thickness from said first side, said sheet body having a generally flat surface on said second side.

17. A sheet with a folding portion, the sheet comprising:

a sheet body on which the folding portion is oriented along a folding portion-forming direction which is perpendicular to a folding direction, said folding portion including a series of recesses and remnants between said recesses, boundary lines being defined between the recesses and the remnants, said boundary lines each being tilted at an acute angle with respect to the folding portion-forming direction and towards the same side as that of an opposite one of the boundary lines having a corresponding remnant therebetween, said recesses being defined by perforations extending between opposite sides of said sheet body, said remnants each having a generally flat surface on at least one side of said sheet body.

* * * * *

UNITED STATES PATENT AND TRADEMARK OFFICE
CERTIFICATE OF CORRECTION

PATENT NO. : 6,666,808 B1
DATED : December 23, 2003
INVENTOR(S) : Haruyoshi Kawata et al.

It is certified that error appears in the above-identified patent and that said Letters Patent is hereby corrected as shown below:

<u>Title page,</u>
Item [73], Assignee, should read,
-- Fuji Seal, Inc., Osaka (JP)
  Tadashi Hashimoto, Shiga (JP) --

Signed and Sealed this

Tenth Day of August, 2004

JON W. DUDAS
*Acting Director of the United States Patent and Trademark Office*